United States Patent [19]

Takahira et al.

[11] Patent Number: 5,220,158
[45] Date of Patent: Jun. 15, 1993

[54] NON-CONTACT IC CARD AND METHOD OF USING THE SAME

[75] Inventors: Kenichi Takahira; Shuzo Fujioka, both of Itami, Japan

[73] Assignee: Mitsubishi Denki Kabushiki Kaisha, Tokyo, Japan

[21] Appl. No.: 762,364

[22] Filed: Sep. 19, 1991

[30] Foreign Application Priority Data

Sep. 19, 1990 [JP] Japan .................................. 2-247239

[51] Int. Cl.$^5$ .............................................. G06K 7/10
[52] U.S. Cl. ...................................... 235/492; 235/380
[58] Field of Search ......................... 235/437, 380, 492

[56] References Cited

U.S. PATENT DOCUMENTS

| | | | |
|---|---|---|---|
| 4,827,111 | 5/1989 | Kondo | 235/492 |
| 4,916,662 | 4/1990 | Mizuta | 235/492 |
| 5,055,661 | 10/1991 | Guchi | 235/492 |
| 5,068,521 | 11/1991 | Yamaguchi | 235/492 |
| 5,105,074 | 4/1992 | Nara | 235/492 |

FOREIGN PATENT DOCUMENTS 2242043 9/1991 United Kingdom .
2243468 10/1991 United Kingdom .

Primary Examiner—Harold Pitts
Attorney, Agent, or Firm—Leydig, Voit & Mayer

[57] ABSTRACT

A non-contact IC card includes an antenna by which data is sent and received without contact, first and second demodulators that demodulate signals received by the antenna, interrupt device interrupts a current flow for operating the first demodulator, a control device selects one of the first and second demodulators via the interrupt device when the second demodulator is selected, data processing device processes data demodulated by the demodulator selected by the control device, a modulator modulates signals from the data processing device and outputs them to the antenna, and a battery supplies power to the respective devices.

6 Claims, 8 Drawing Sheets

NON-CONTACT IC CARD AND METHOD OF USING THE SAME

BACKGROUND OF THE INVENTION

1. Field of the Invention

The present invention relates to a non-contact IC card, and more particularly to the construction of a non-contact IC card which is capable of controlling power consumption and a method of using the same.

2. Description of the Related Art

In recent years, among the various IC cards, attention has focused on non-contact IC cards which do not have exterior electrodes on the surfaces thereof. Non-contact IC cards send and receive signals among external devices in the same way as ordinary IC cards having exterior electrodes. These signals are sent and received using space transmission media such as electromagnetic waves, light, or magnetism.

The construction of a conventional non-contact IC card is shown in FIG. 7. ROM 2 and RAM 3 are connected via a bus 8 to a CPU 1 that controls the operation of the IC card. An input/output control circuit 4 that controls the inputting and outputting of data with external devices is connected to the bus 8. An antenna 6 is connected to the input/output control circuit 4 via a modulation/demodulation circuit 5. In addition, a battery 7 for supplying power to the respective electrical circuits is built into the IC card.

In such an IC card, when a request signal from an external device is received by the antenna 6, this request signal is demodulated by the modulation/demodulation circuit 5, and then is input to the CPU 1 via the input/output control circuit 4. The CPU 1 deciphers the request signal and generates a predetermined response signal. This response signal is input to the modulation/demodulation circuit 5 via the input/output control circuit 4. After the signal is modulated by the modulation/demodulation circuit 5, it is transmitted to an external device from the antenna 6.

FIG. 8 shows the construction of a demodulation circuit section of the modulation/demodulation circuit 5. The antenna 6 is connected to the positive input terminal of a comparator 51; A reference voltage generation circuit 52 is connected to the negative input terminal. A waveform shaping circuit 53 is connected to the output terminal of this comparator 51. A signal received by the antenna 6 is compared with a reference voltage generated by the reference voltage generation circuit 52. When the signal received has a voltage value higher than the reference voltage, a signal corresponding to the signal received is output from the comparator 51. After this output signal is shaped to a predetermined waveform by the waveform shaping circuit 53, it is transmitted to the input/output control circuit 4 as received data.

As shown in FIG. 8, however, since the reference voltage genration circuit 52 within the modulation/demodulation circuit 5 generates a reference voltage by dividing the power-supply voltage with resistors 54 and 55, current flows through these resistors 54 and 55 at all times. Therefore, a problem arises in that even when the card is not used, such as during storage, the battery 7 is consumed, and the actual service life of an IC card is shortened depending upon the length of the storage period before the card is issued.

SUMMARY OF HE INVENTION

The present invention has been devised to solve the above-mentioned problem. An object of the present invention is therefore to provide non-contact IC cards with extended service life. another object of the present invention is to provide a way of using such non-contact IC cards which.

A non-contact IC card according to a first embodiment of the present invention comprises an antenna means by which data is sent to and received from the outside without contact; first and second demodulation means that demodulate signals received by the antenna means; an interrupt means that interrupts a circuit current used for operating the first demodulation means; a control means that selects one of the first and second demodulation means and interrupts the circuit current of the first demodulation means in response the interrupt means when the second demodulation means is selected; a data processing means for processing data demodulated by the demodulation means selected by the control means from the first and second demodulation means; a modulation means that modulates signals from the data processing means and outputs them to the antenna means; and a battery for supplying power to the respective means.

A non-contact IC card do according to a second embodiment of the present invention comprises a data sending and receiving means by which data is sent and received to and from the outside without contact; a resetting means by which a reset signal is received from outside without contact; a data processing means, connected to the data sending and receiving means, for processing data; a stopping means for stopping the operation of the data sending and receiving means; a control means for stopping operation of the data sending and receiving means by using the stopping means and that releases the stoppage of the data sending and receiving means when a reset signal is received via the resetting means; and a battery for supplying power to the respective means.

A method of using non-contact IC cards of the third embodiment of the present invention, which has a normal mode in which operations are performed routinely and a sleep mode in which reception of a starting signal returns the cord to the normal mode, comprises the steps of: keeping non-contact IC cards in a sleep mode until a card is issued; and changing the mode of the card to a normal mode once the card is issued.

In a non-contact IC card according to a first embodiment of the present invention, the control means selects one of the first and second demodulation means. When the second demodulation means is selected, the interrupt means interrupts the circuit current of the first demodulation means.

In a non-contact IC card according to a second embodiment of the present invention, the stopping means stops the operation of the data sending and receiving means, and the control means releases the stoppage of the data sending and receiving means when a reset signal is received via the resetting means.

In a method of using non-contact IC cards according to a third embodiment of the present invention, non-contact IC cards are kept in sleep mode and a starting signal is provided when a card is issued, so that the mode shifts to the normal mode once the card is issued.

DESCRIPTION OF THE PREFERRED EMBODIMENTS

The embodiments of the present invention will be explained below with reference to the accompanying drawings.

Figure 1:
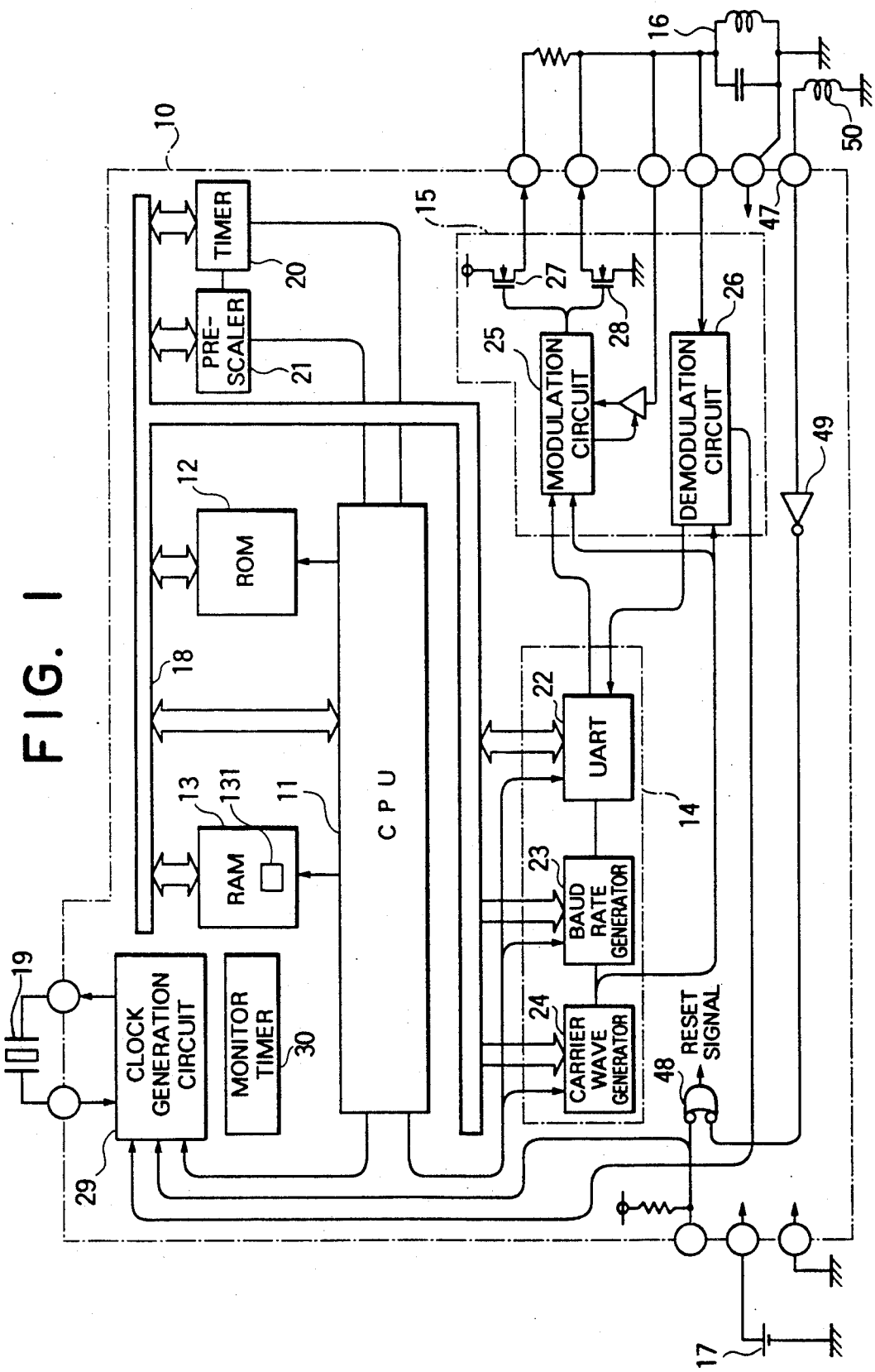
FIG. 1 is a block diagram showing the construction of a non-contact IC card according to an embodiment of the present invention.

In FIG. 1, a non-contact IC card of an embodiment of the present invention has an IC 10 to which an antenna circuit 16, a battery 17 and a crystal oscillator 19 are connected. The IC 10 has a CPU 11 connected to a bus 18. Connected to the bus 18 are a ROM 12 in which programs for controlling the operation of the CPU 11 are stored, a RAM 13 in which data is stored, and an input/output control circuit 14 that controls the inputting and outputting of data with external devices (not shown). Also connected to the bus 18 is a timer 20 that counts by dividing the frequency of an internal clock signal and a prescaler 21 by which the initial value of this timer 20 is set.

The input/output control circuit 14 has a UART 22 for asynchronous serial data transmission, a baud rate generator 23 for setting the transmission speed of the UART 2, and a carrier wave generator 24 that generates carrier waves. A modulation/demodulation circuit 15 is connected to the input/output control circuit 14, and the antenna circuit 16 is connected to this modulation/demodulation circuit 15. The modulation/demodulation circuit 15 includes a modulation circuit 25 that modulates the output of the UART 22 by using carrier waves, a demodulation circuit 26 that demodulates the input signal from the antenna circuit 16, and output transistors 27 and 28 for driving the antenna circuit 16.

A clock generation circuit 29 for supplying a clock signal to each circuit within the IC 10 is connected to the CPU 11 and the demodulation circuit 26 of the modulation/demodulation circuit 15. This clock generation circuit 29 is connected to the crystal oscillator 19 outside the IC 10. Reference numeral 30 denotes a monitor timer for monitoring runaway of the CPU 11.

A coil 50 is connected to the reset terminal 47 of the IC 10. A signal generated in the coil 50 due to electromagnetic induction from a magnetic field formed by an external device is detected by a reset reception circuit 49 composed of a CMOS inverter gate. This signal is taken in as an internal reset signal via an OR gate 48.

In addition, a control flag 131 for monitoring the condition of the IC card is set up inside the RAM 13.

The antenna circuit 16 comprises an antenna means; the modulation/demodulation circuit 15 and the antenna circuit 16 comprises a data sending and receiving means; the CPU 11 comprises a data processing means; the modulation circuit 25 comprises a modulation means; and the coil 50 and the reset reception circuit 49 comprises the reset means.

Figure 2:
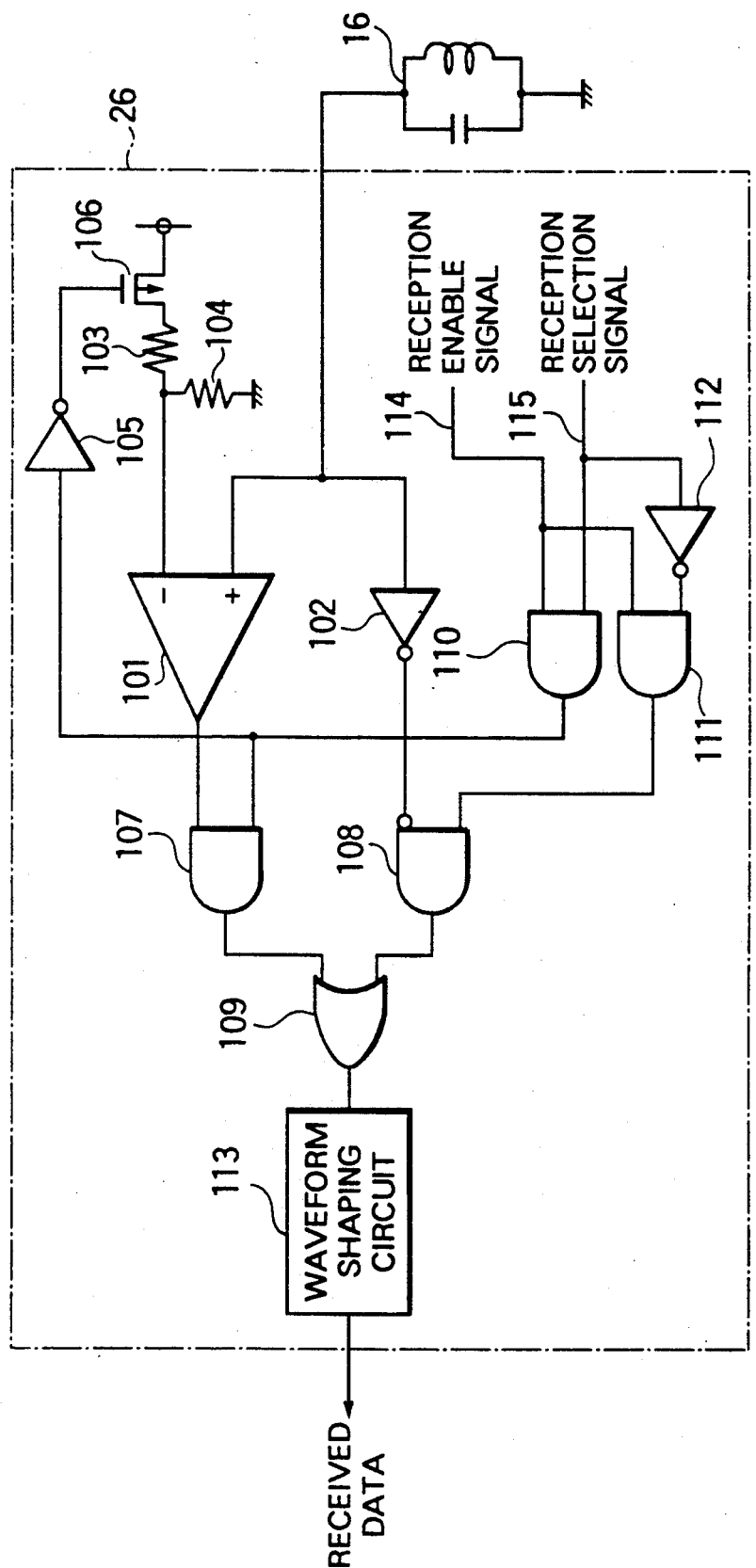
FIG. 2 is a block diagram showing the internal construction of a demodulation circuit.

FIG. 2 shows the internal construction of a demodulation circuit 26 of the modulation/demodulation circuit 15. The antenna circuit 16 is connected to the positive input terminal of a comparator 101 and to a CMOS inverter 102. Connected to the negative input terminal of the comparator 101 is a reference voltage circuit that generates a reference voltage by dividing a power-supply voltage using resistors 103 and 104. A transistor 106 which serves as an interrupt means connects the resistor 103 to a power-supply line. Since the comparator 101 has a reference voltage generated by the reference voltage circuit as a threshold value, it is required that a bias current flow through the reference voltage circuit at all times during operation. The threshold value of this comparator 101 is relatively small so that a signal from an external device can be received while a card is ordinarily in use. Meanwhile, a CMOS inverter 102 has a threshold value greater than that of the comparator 101, and therefore a minimum amount of current is consumed while waiting for a signal.

Signal lines 114 and 115 through which a reception enable signal and a reception selection signal are respectively transmitted from the CPU 11 are connected to an AND gate 110. The signal line 115 is connected to an inverter 112, and the output of the inverter 112 and a signal line 114 are input to an AND gate 111. The outputs of the comparator 101 and the AND gate 110 are input to an AND gate 107, and the outputs of the CMOS inverter 102 and the AND gate 111 are input to an AND gate 108. The outputs of these AND gates 107 and 108 are input to a waveform shaping circuit 113 via an OR gate 109. The output of the AND gate 110 is input to the gate of the transistor 106 via an inverter 105.

A reception enable signal is a control signal used to input, as received data, the output of the comparator 101 or the CMOS inverter 102 via the waveform shaping circuit 113. A reception selection signal is a control signal used to determine which of either the comparator 101 or the CMOS inverter 102 should be selected.

When both the reception enable signal and the reception selection signal are at "H" level, since the output of the AND gate 110 goes to "H" level, the transistors 106 and 107 go into a conduction state, thereby causing a bias current to flow through the reference voltage circuit. On the other hand, since the output of the AND gate 111 goes to "L" level, the AND gate 108 goes into an interrupt state. That is, the mode is set to a normal mode in which demodulation by the comparator 101 is made possible.

When at least one of the reception enable signal and the reception selection signal is at "L" level, since the output of the AND gate 110 goes to "L" level, the AND gate 107 goes into an interrupt state and the transistor 106 is interrupted, thereby causing no bias current to flow through the reference voltage circuit. That is, the comparator 101 becomes inoperative, and the power consumption of the demodulation circuit 26 is extremely small. This state is called a sleep mode. This sleep mode is further classified into two modes described below.

When the reception enable signal is at "H" level and the reception selection signal is at "L" level, since the output of the AND gate 111 goes to "H" level, the output of the CMOS inverter 102 is input to the OR gate 109 and the waveform shaping circuit 113 via the AND gate 108. As a result, the detection by the CMOS inverter 102 of signals received by the antenna circuit 16 is made possible. On the other hand, when the reception enable signal is at "L" level, since the outputs of both the AND gates 110 and 111 go to "L" level, both the AND gates 107 and 108 go into an interrupt state. That is, the demodulation circuit 26 is placed in a stopped state.

In the IC card described in claim 1, the comparator 101 and the reference voltage circuit comprises a the first demodulation means; the CMOS inverter 102 comprises a second demodulation means; the transistor 106 comprises an interrupt means; and AND gates 107, 108, 110, and 111, the OR gate 109, the inverters 105 and 112, and the CPU 11 comprises a control means.

In the IC card described in claim 2, the transistor 106, AND gates 107, 108, 110, and 111, the inverters 105 and 112, the OR gate 109, and the CPU 11 comprises a stoppage means and a control means.

Figure 3:
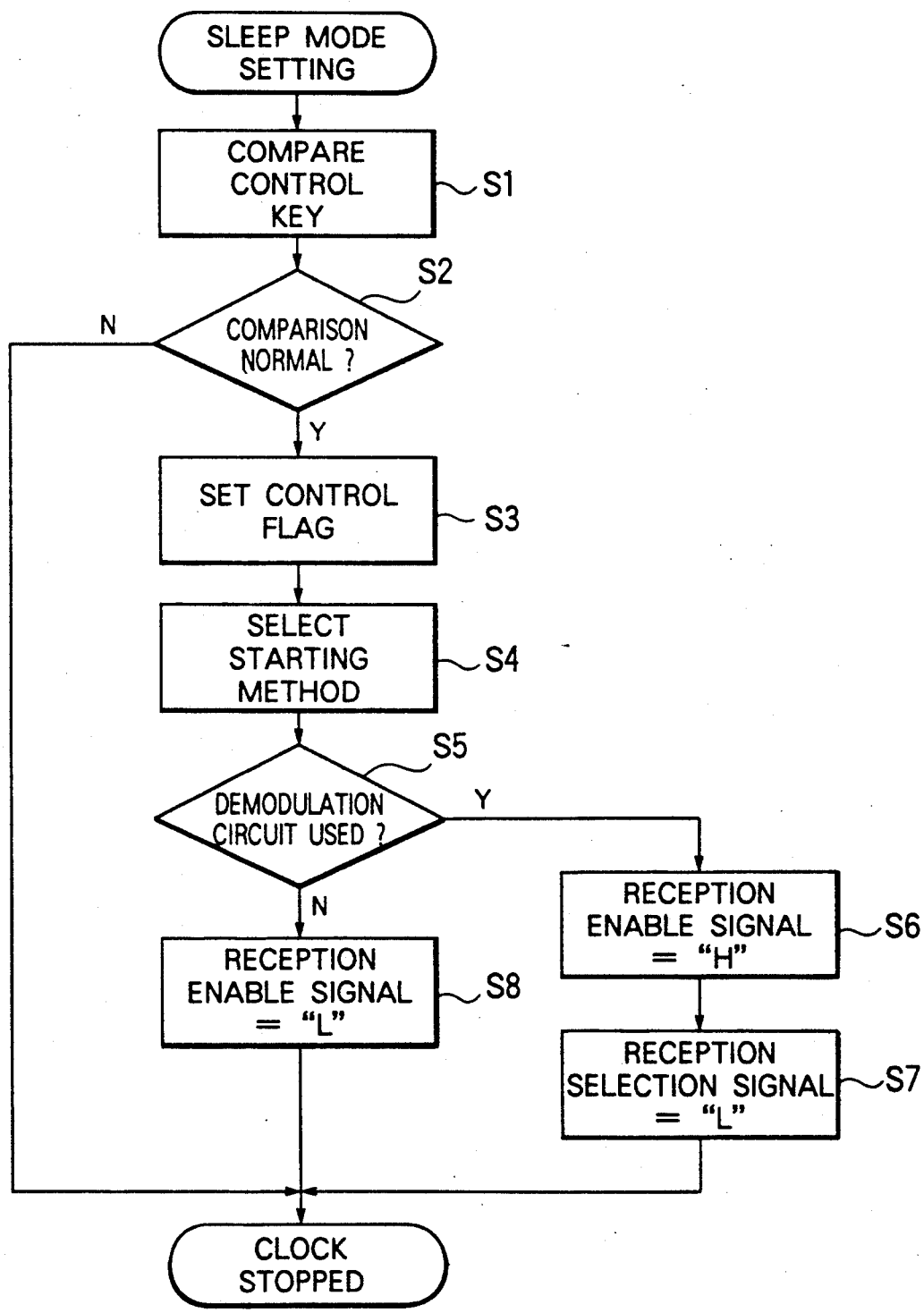
FIGS. 3 through 5 are flowcharts showing the operation of the embodiment.

Next, the operation of the embodiment will be explained. Referring to a flowchart in FIG. 3, the operation of placing an IC card in sleep mode will be explained. First, a control key is sent from an unillustrated external device while the CPU 11 is operating and waiting for a command. This control key is received by the antenna circuit 16, and is then input to the CPU 1 via the demodulation circuit 26 and the input/output control circuit 14. The CPU 11 compares the input control key with a reference key stored in a predetermined area in the RAM 13 or ROM 12 in step S1. When the comparison is judged to be normal in step S2, the CPU 11 resets the control flag 131 in the RAM 13 in step S3.

Next, in step S4, a command to specify a starting method when the mode is changed from sleep mode to normal mode is sent from the external device, and the starting method is selected. In this embodiment, as a starting method, either of the following two methods can be selected: i) a method in which a trigger is received by the CMOS inverter 102 in the demodulation circuit 26 via the antenna circuit 16, and ii) a method in which a reset signal is received by the coil 50 and the reset reception circuit 49 without using the demodulation circuit 26.

When the CPU 11 judges that the starting method i) in which the demodulation circuit 26 is used is selected in step S5, the CPU 11 outputs an "H" level reception enable signal and an "L" level reception selection signal to the demodulation circuit 26 in turn in steps S6 and S7. As a result, the transistor 106 shown in FIG. 2 is placed in an interrupted state, and a sleep mode is set. Since an "H" level signal is output to the AND gate 108 from the AND gate 111 at this time, trigger reception by the CMOS inverter 102 is made possible. On the other hand, if it is determined in step S5 that the starting method ii) in which the demodulation circuit 26 is not used is selected, the CPU 11 outputs a "L" level reception enable signal to the demodulation circuit 26 in step S8. As a result, the transistor 106 is caused to enter an interrupted state, and sleep mode is set. At this time, both the AND gates 107 and 108 are interrupted, causing the demodulation circuit 26 to be placed in a stopped state.

After the sleep mode is set in the above way, the CPU 11 stops the generation of the internal clock signal by the clock generation circuit 29 and shifts to a waiting state. When it is determined in step S2 that the comparison of the control key is not normal, the generation of the internal clock signal is stopped as it is without setting a sleep mode and the CPU 11 enters the waiting state.

Figure 4:
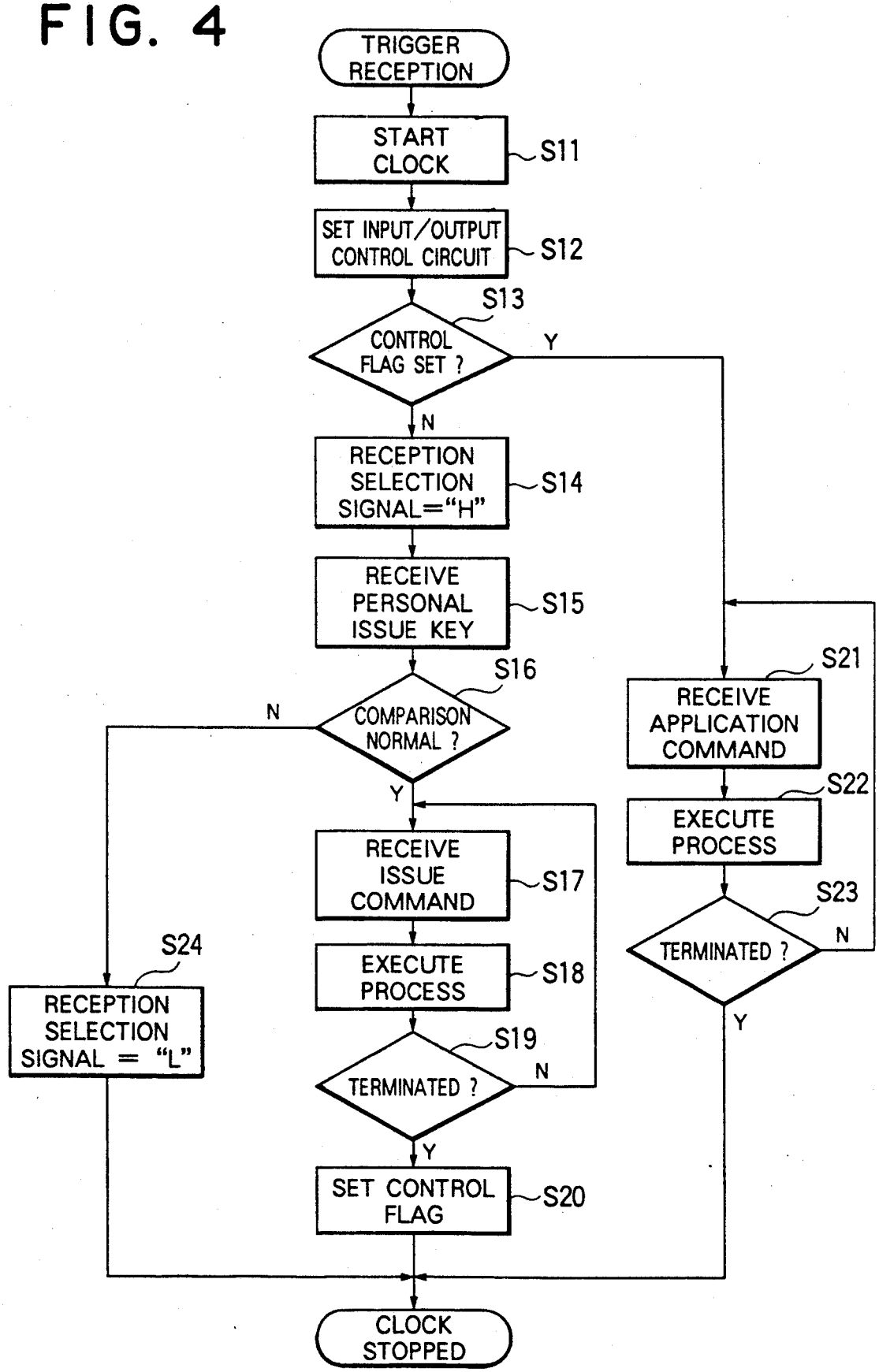

Next, referring to a flowchart in FIG. 4, the starting method i) of returning the mode to the normal mode from the sleep mode by using the demodulation circuit 26 will be explained. It is assumed that a reception enable signal is at "H" level and a reception selection signal is at "L" level. A trigger signal is received by the antenna circuit 16 as a starting signal from an external device and is input to the CMOS inverter 102 of the demodulation circuit 26. This trigger signal has a signal level higher than an ordinary request signal. Hence, it is detected by the CMOS inverter 102 and is input to the waveform shaping circuit 113 via the AND gate 108 and the OR gate 109. After the trigger signal is shaped by the waveform shaping circuit 113, it is input to the clock generation circuit 29 in FIG. 1, causing the clock generation circuit 29 to start the internal clock in step S11.

When the internal clock starts in this way, the CPU 11 sets the control parameters of the input/output control circuit 14 for controlling communication with external devices in step S12. Next, the CPU 11 determines in step S13 whether or not the control flag 131 within the RAM 13 has been set. When the control flag 131 has not been set as a result of the determination, it is determined that this IC card is in the sleep mode. The reception selection signal goes to "H" level in step S14, causing the mode to change to the normal mode from the sleep mode. Then, a personal issue key is received from an external device in step S15. In step S16, the CPU 11 compares the received personal issue key with a reference key stored in a specific area within the RAM 13 or the ROM 12. When it is judged that the comparison is normal, an issue command is received from an external device in step S17. In step S18, a process for the issue command is executed. These steps S17 and S18 are repeated until it is determined in step S19 that the issue process is terminated.

On termination of the issuing process, the CPU 11 sets the control flag 131 in step S20. Thereafter, the CPU 11 stops the generation of the internal clock signal by the clock generation circuit 29 and enters the waiting state.

When a trigger is received from the external device after the mode returns to the normal mode from the sleep mode, the trigger signal is detected by the comparator 101 of the demodulation circuit 26, causing the internal clock signal to start in step S11. Next, after the control parameters of the input/output control circuit 14 are set in step S12, the CPU 11 determines in step S13 whether or not the control flag 131 has been set. Since the control flag 131 has already been set, the process proceeds to step S21, in which an application command is received from an external device. In step S22, a process for the application command is performed. These steps S21 and S22 are repeated until it is determine in step S23 that all processes are finished. On termination of all the processes, the CPU 11 stops the generation of the internal clock signal by the clock generation circuit 29 and enters the waiting state.

When it is determined in step S16 that the result of the comparison is not normal, the mode is set to the sleep mode by setting the reception selection signal to "L" level in step S24 without performing an issuing process. Thereafter, the CPU 11 stops the generation of the internal clock signal and enters the waiting state.

Figure 5:
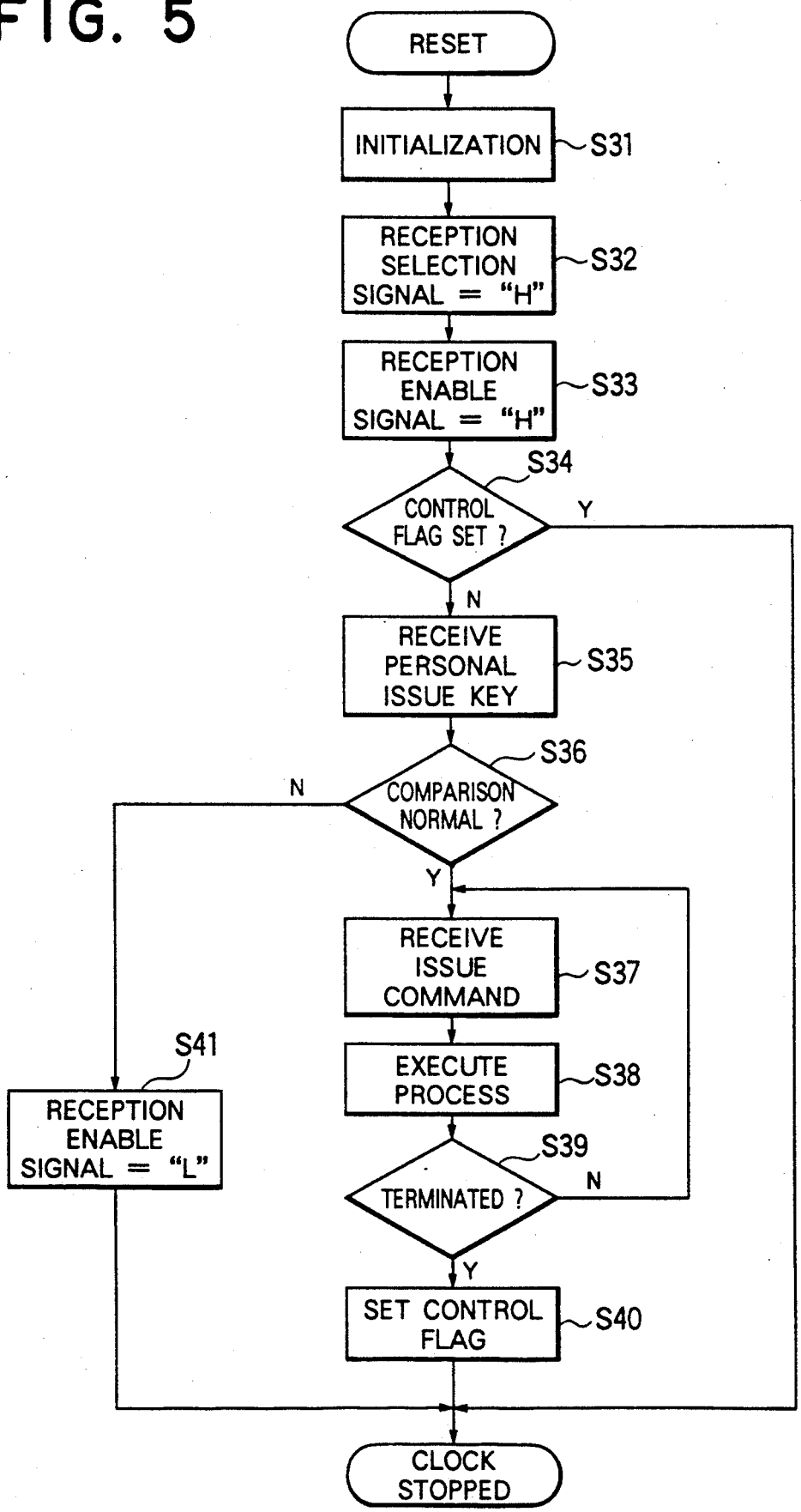

Next, referring to the flowchart in FIG. 5, the starting method ii) of returning the mode to the normal mode from the sleep mode by using the coil 50 and the reset reception circuit 49 without using the demodulation circuit 26 will be explained. It is assumed that the reception enable signal is at "L" level. First, a reset signal is received by the coil 50 by means of electromagnetic induction as a starting signal from an external device. It is detected by the reset reception circuit 49 composed of a CMOS inverter gate. This reset signal is taken into the clock generation circuit 29 via the OR gate 48, causing the internal clock signal to start.

When the internal clock signal is started in this way, the CPU 11 is initialized for operations in step S31. In addition, both the reception selection signal and the reception enable signal are set to "H" level in steps S32 and S33, causing the mode to change to the normal mode from the sleep mode. Next, it is determined in step S34 whether or not the control flag 131 within the RAM 13 has been set. When it is determined that the control flag 131 has not been set, it is determined that this IC card has been in the sleep mode and an personal issue key is received from an external device in step S35 in order to perform an issuing process. The CPU 11 compares the received personal issue key with a reference key stored in a predetermined area in the RAM 13 or ROM 12 in step S36. When the comparison is normal, the issuing process is performed in steps S37 to S39 in the same way as in steps S16 to S18 of FIG. 4.

On termination of the issuing process, the CPU 11 sets the control flag 131 in step S40. Thereafter, the CPU 11 stops the generation of the internal clock signal by the clock generation circuit 29 and enters the waiting state.

When the comparison of the issuing key is determined not to be normal in step S36, the reception enable signal is set to "L" level in step S41 without performing the issuing process in order to return the mode to the sleep mode. Thereafter, the CPU 11 stops the generation of the internal clock signal and enters the waiting state.

Figure 6:
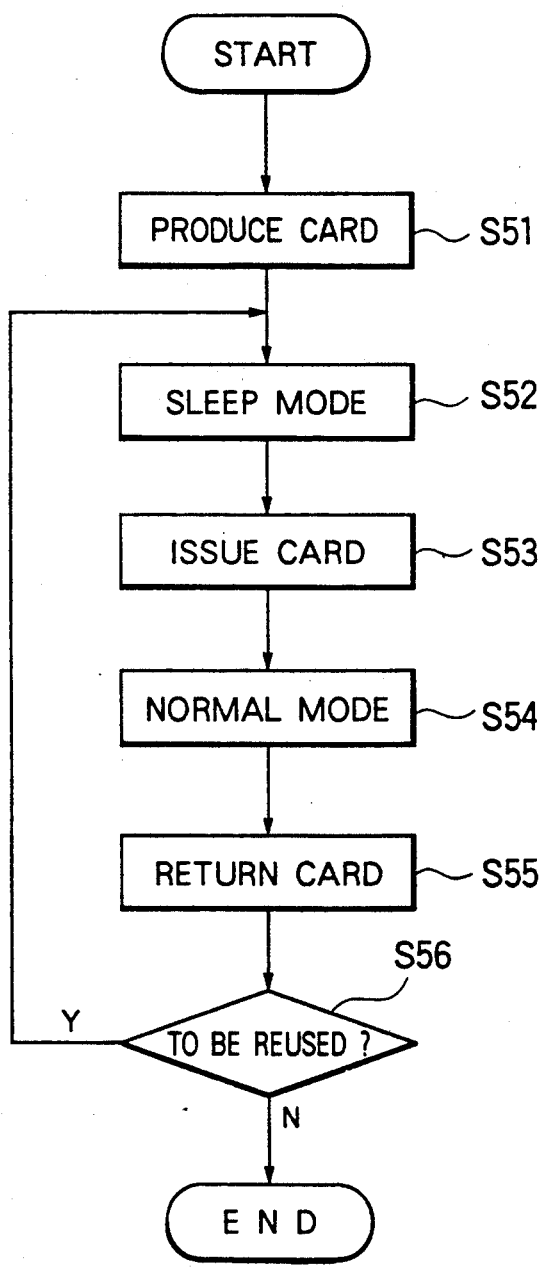
FIG. 6 is a flowchart showing a method of using non-contact IC cards of the present invention.
Figure 7:
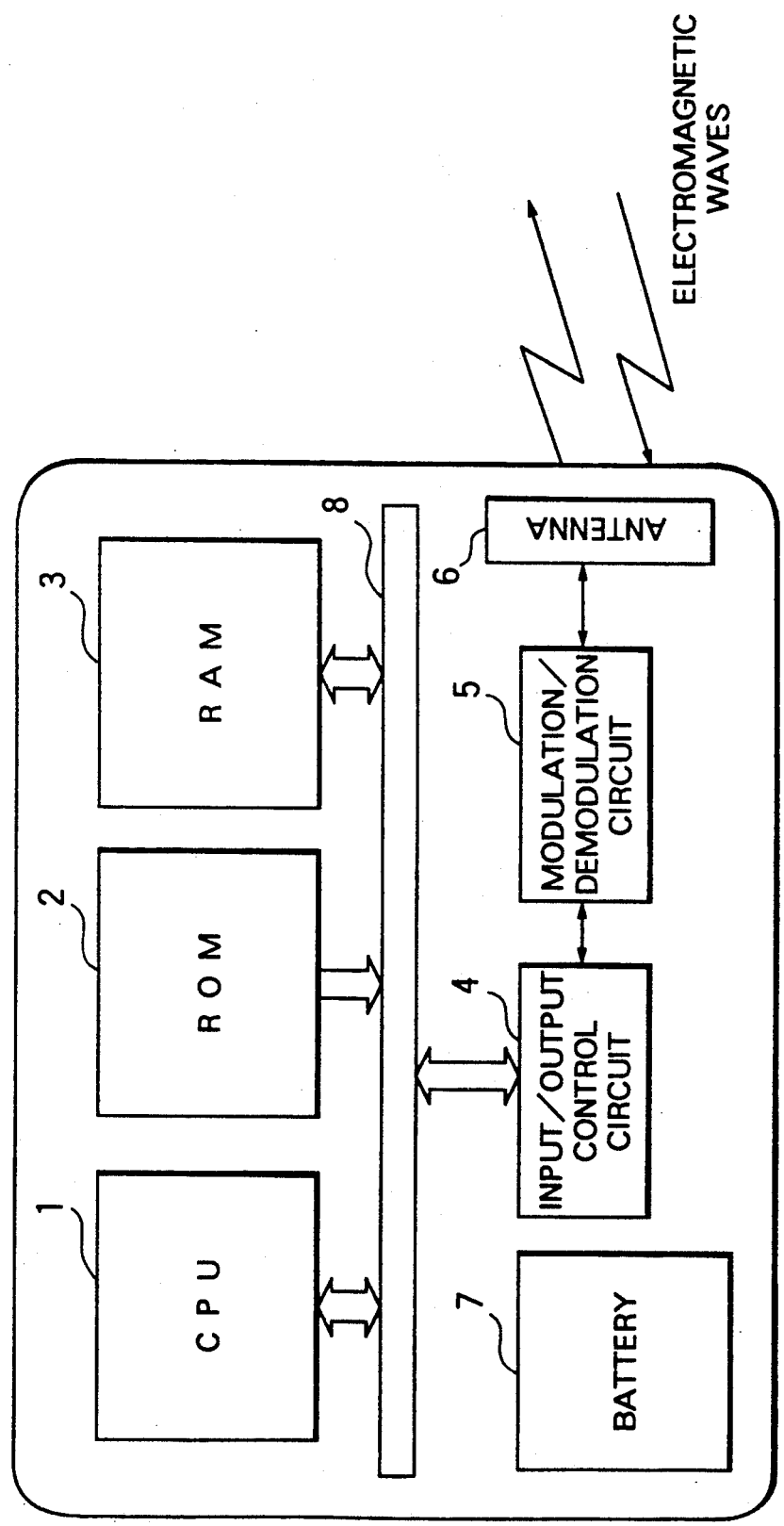
FIG. 7 is a block diagram showing the construction of a conventional non-contact IC card.
Figure 8:
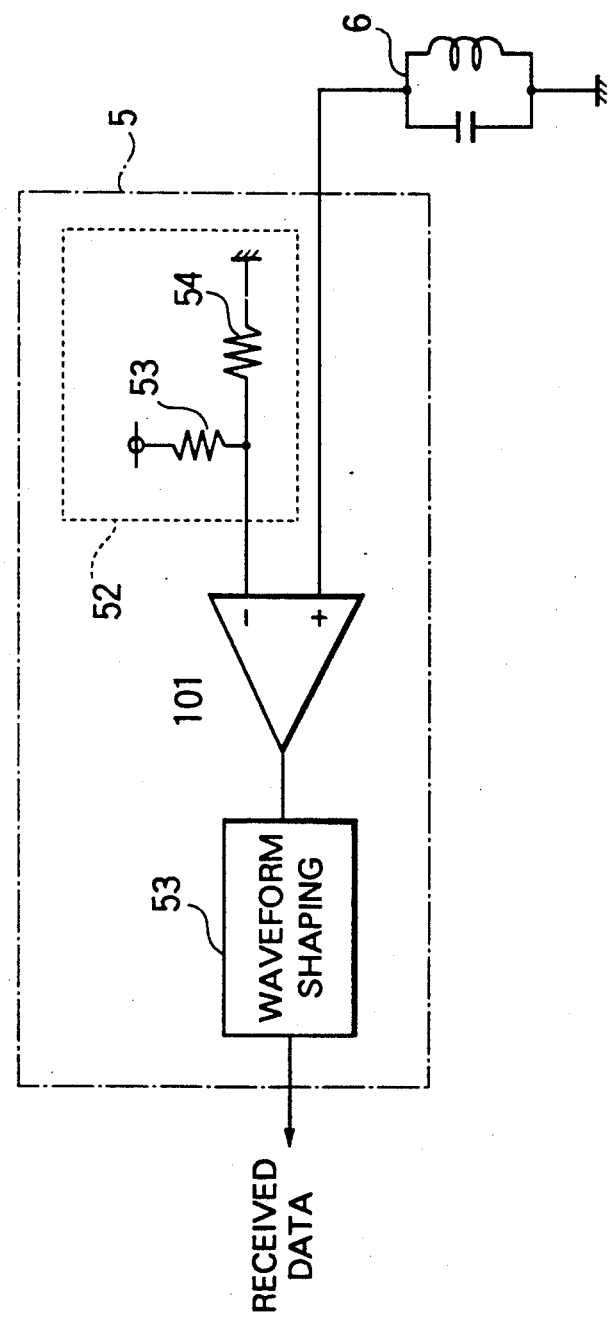
FIG. 8 is a block diagram showing the demodulation circuit section of a modulation/demodulation circuit in the IC card shown in FIG. 7.

FIG. 6 is a flowchart showing a method of using non-contact IC cards shown in FIG. 1. After an IC card is produced in step S51 first, the mode is set to sleep mode in step S52 in accordance with the flowchart of FIG. 3. The IC card is shipped to a person who issues the card in this condition. The person who issues the card keeps this IC card without changing the sleep mode until the card is issued. When the card is issued, an issuing process is performed in step S53, and the mode is set to the normal mode in step S54. The IC card which is set to the normal mode in this way is subjected to a prescribed use, and then it is returned in step S55. Where the returned card is to be reused, the process returns to step S52 in the next step S56, and the mode is set to the sleep mode again and the IC card is stored until the card is issued.

The adoption of such method of use as described above causes an IC card to be set in a sleep mode while it is stored. Therefore, the consumption of a battery 17 is suppressed, and the life of an IC card in actual use is extended.

What is claimed is:

1. A non-contact IC card comprising:

antenna means by which data is sent and received without contact;

first and second demodulation means for demodulating signals received by said antenna means;

interrupt means for interrupting a current flow operating said first demodulation means;

control means for selecting one of said first and second demodulation means and for actuating said interrupt means to interrupt the current flow when said second demodulation means is selected by said control means;

data processing means for processing data demodulated by the demodulation means selected by said control means from said first and second demodulation means to produce a data signal;

modulation means for modulating the data signal produced by said data processing means and for outputting the modulated signal to said antenna means; and a battery for supplying power to said first and second demodulation means, interrupt means, control means, data processing means, and modulation means.

2. A non-contact IC card as claimed in claim 1 wherein said first demodulation means has a fist threshold for detecting a normal request signal exceeding the fist threshold and said second demodulation means has a second threshold higher than said first threshold whereby said second demodulation means does not response to a normal request signal.

3. A non-contact IC card as claimed in claim 1 wherein said second demodulation means comprises of CMOS cicuits.

4. A non-contact IC card comprising:

data sending and receiving means or sending and receiving data without contact;

resetting means for detecting a reset signal received by the IC card without contact;

data processing means, connected to said data sending and receiving means, or processing data;

stopping means for stopping operation of said data sending and receiving means;

control means for actuating said stopping means to stop said data sending and receiving means and for actuating said stopping means to release stoppage of said data sending and receiving means when a reset signal is detected by said resetting means; and a battery for supplying power to said resetting means, data processing means, stopping means, and control means.

5. A non-contact IC card as claimed in claim 4 wherein said resetting mean comprises of CMOS circuits.

6. A method of using non-contact IC cards having a normal mode in which operations are performed routinely and a sleep mode in which only reception of a starting signal returns the IC card to the normal mode comprising the steps of:

maintaining a non-contact IC card in a sleep mode until the card is issued; and applying a starting signal to the card, changing the card from the sleep mode to a normal mode when the card is issued.

* * * * *

UNITED STATES PATENT AND TRADEMARK OFFICE
CERTIFICATE OF CORRECTION

PATENT NO. : 5,220,158

DATED : June 15, 1993

INVENTOR(S) : Takashira et al.

It is certified that error appears in the above-identified patent and that said Letters Patent is hereby corrected as shown below:

Claim 2, col. 8, lines 25 and 27, change "fist" to --first--.

Claim 2, col. 8, line 30, change "response" to --respond--.

Claim 3, col. 8, line 32, delete "of".

Claim 4, col. 8, line 35, change "or" to --for--.

Claim 4, col. 8, line 40, change "or" to --for--.

Claim 5, col. 8, line 52, delete "of".

Signed and Sealed this

First Day of February, 1994

Attest:

BRUCE LEHMAN

*Attesting Officer*     *Commissioner of Patents and Trademarks*